Patented June 24, 1930

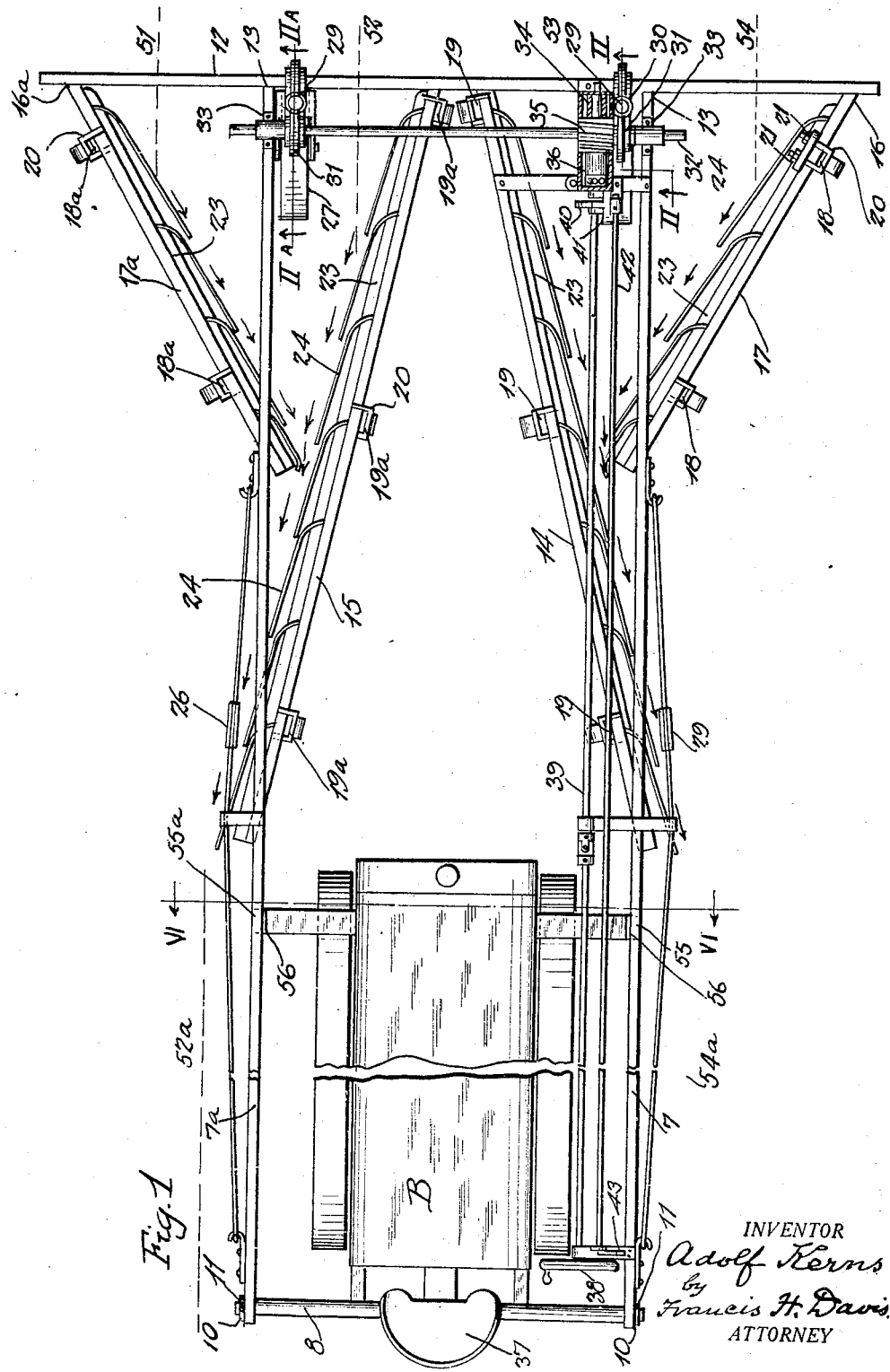

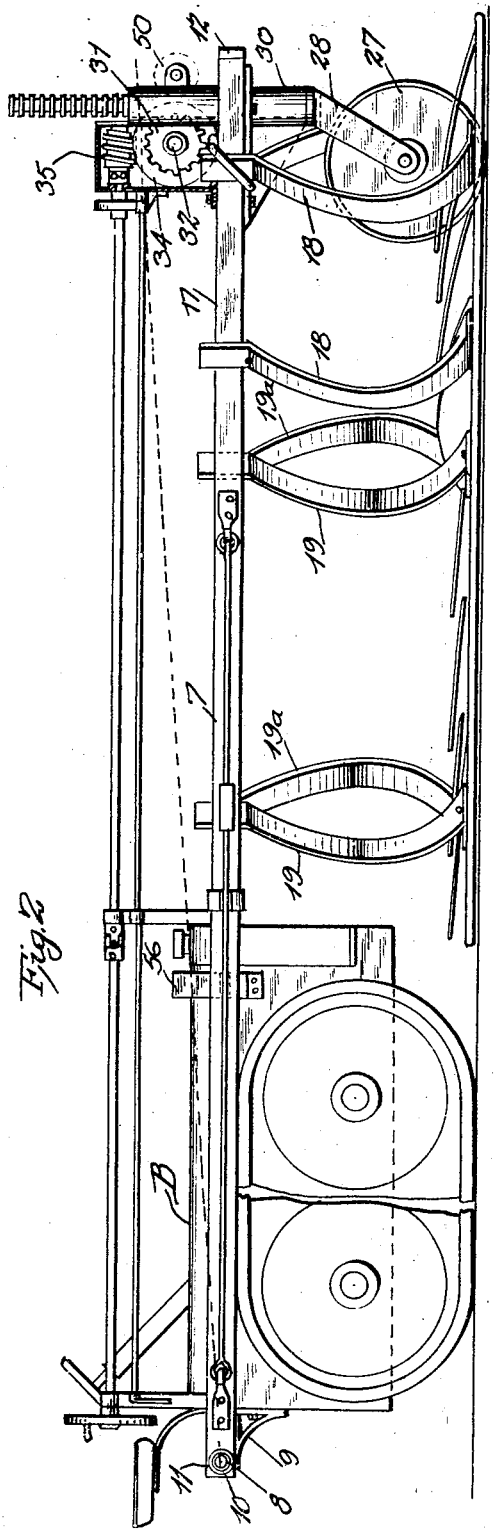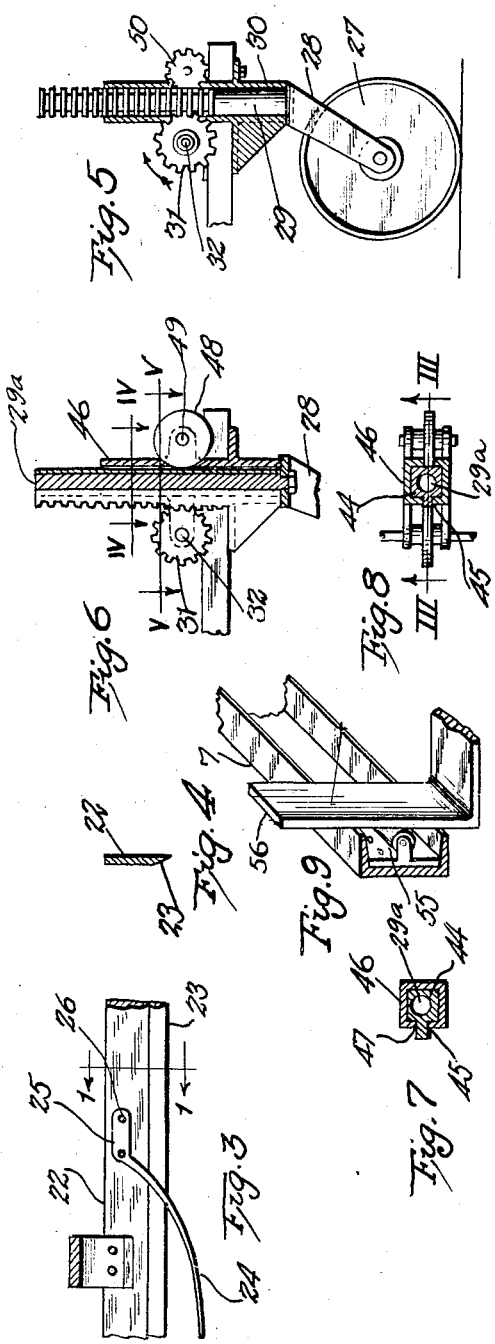

1,768,324

UNITED STATES PATENT OFFICE

ADOLF KERNS, OF GONZALES, CALIFORNIA

HARVESTING MACHINE

Application filed October 18, 1928. Serial No. 313,275.

My invention relates to a class of machinery that is adapted for the harvesting of such crops as peas and beans, wherein the stalks or stems carrying the grain are mown off close to the ground and left in rows to be garnered.

The general purpose of my invention is to supply a harvesting machine which may be pushed or drawn through crops such as legumes in the direction of the rows thereof. The machine is provided with certain pairs of blades that are set obliquely to each other and adapted to scrape along the ground. The inner blades are longer than the outer so as to form Y-shaped openings of any suitable number or angle, each said opening being preferably wide enough at the forward end to take in two rows of the crop, said blades however, not forming a completely closed Y but having the outer members cut off adjacent the inner, so as to leave room for the passage of the shorn crop out through the apex of said Y. Each blade has a cutting edge opposite the companion blade within the Y and is provided with backwardly-pointing sweep-members adapted to converge two rows of cut crop into one, and also to act as guide means to prevent said crop from glutting the Y's or falling over the blades.

For the present purpose my machine is shown as adapted to be pushed forward by a conventional tractor being pivotally attached to the rear end thereof for a further purpose to be explained, although obviously any suitable power may be employed.

Clearly, where tracts of beans and peas many thousands of acres in extent have to be harvested the saving effected by the use of my improved harvesting machine over crude methods is very great.

My invention has for its objects the following desideratums:

To provide a harvesting machine having an upper structural frame of suitable design to form the support for certain standards adapted to carry cutting blades which scrape along under the surface of the ground.

To provide a plurality of such blades set at oblique angles to each other in such a way that any pair of opposite blades will take in two rows of crop.

To provide sweep-guide-members.

To provide a pivoted structure adapted to be elevated at the forward end when turning headlands or traveling in disuse.

To provide certain novel front wheels having pivotal bearing-stems combining rack elements and pinion means co-operative therewith for the elevation or depression of said cutting blades relative to the surface of the ground to be traversed.

To provide antifriction guide means for a vertically movable frame.

To provide locking and release means for maintaining the said frame in relative raised position.

With the foregoing and other advantages, the invention consists in the novel construction and arrangement of parts, particularly defined in the claims and illustrated in the accompanying drawings, in which:—

Figure 1 is a plan of the machine of my invention with a diagrammatically-shown tractor.

Fig. 2 shows the machine in side elevation.

Fig. 3 shows, on a larger scale, a plan view of a section of a blade carrying a sweep member.

Fig. 4 is a cross-section through Fig. 3 on the line I—I.

Fig. 5 is a sectional-elevational view of a pivotal bearing-element, taken on the line II—II or IIA—IIA of Fig. 1.

Fig. 6 is a sectional-elevational view taken on the line III—III of Fig. 9.

Fig. 7 is a cross-section taken on the line IV—IV of Fig. 6.

Fig. 8 is a plan of a modified bearing-element with the vertical part thereof removed along the line V—V of Fig. 6.

Fig. 9 is an isometrical view of the antifrictional element taken on the line VI—VI of Fig. 1.

Similar reference characters refer to similar parts throughout the several views.

Referring in detail to the drawings:—

B is a diagrammatical representation of a tractor, to the rear end of which is pivoted the side frame members 7 and 7ª by means of the pipe or shaft 8 carried in the bearing 9, said members being free for vertical pivotal movement on the shaft but secured against lateral movement thereon by means of the collars 10—10 secured to the shaft 8 by the through-pins 11.

Said side members (preferably steel channels) extend parallelly forward to the right so as to make right angle connection at the points 13—13 with the front member of the structural frame 12. From points approximately adjacent the center of the length of the member 12 the standard-bearing frame members 14 and 15 run back obliquely out to connect with the respective members 7 and 7ª, whereas, from the outer points 16 and 16ª of the member 12 the outer standard-bearing frame members 17 and 17ª are disposed at inwardly inclined angles to connect with the respective frame members 7 and 7ª. The purpose of said outer members is to act as a rigid support for the respective standards 18—18 and 18ª—18ª, whereas, the purpose of the members 14 and 15 is for the rigid support of their respective standards 19, 19, 19, and 19ª, 19ª, 19ª, all of which standards are held rigidly in relation to their relative frame members by the well-known U-bolt means 20, being adjustably secured by the nuts 21.

All said standards are suitably bowed for crop-matter to pass thereby, as is well shown in Fig. 2, and have their bottom ends flattened off to a horizontal plane so that when their respective blades 22 etc., are attached thereto and thereunder, said blades will be in a horizontal plane. Said blades are preferably of flat steel beveled at 23 to a cutting edge, all along one side, as is well shown in Figs. 3 and 4.

All said blades are provided with sweep guide-members as 24 or other suitable shape adapted to act as a fender and guide to crowd crop matter over from said blades so as to dispose said matter according to the course of the indicating arrows, as will later appear. The members 24 may have their attaching ends 25 flattened as shown in Fig. 3 and be attached to the respective blades by riveting or other suitable means as 26.

Owing to the peculiar dispositions of the various frame members 14, 15, 17 and 17ª with relation to the frame members 7, 7ª and 12, the portion of said structural frame in advance of the tractor element B is very rigid against side flexure although comparatively flexible to inequalities of surface. In order to stiffen said frame against side flexure in the parts thereof which traverse the length of the tractor element where cross or diagonal braces from the member 7 to 7ª are impractical, the turn-buckle elements 26, 26 are provided, the application and use of which is obvious.

The back end of said frame being supported pivotally at 8, the front end is supported in normal position by the pivotally-mounted wheels 27, 27, said wheels being supported off-center by the strap 28, from the center of which the pivotal stem 29 extends in the bearing 30.

Said stem is rotatable in the bearing 30 and of round section for a suitable distance up, the remainder of its length being provided with a series of ringed grooves 29ª whose contour is adapted for interengagement with a fixed pinion 31, said series of grooves being in effect a rack which may be revolved to any degree without loss of engagement, as well shown in Figs. 2 and 5.

By reference to Fig. 1, the shaft 32 mounted in the bearings 33—33 carried by the forward end of said frame lies parallel to the pivotal means 8. Said shaft is provided with the pinions 31, 31 keyed fast thereto, and intermeshing with the respective grooved elements 29ª. Keyed fast to the shaft 32 is the worm gear 34 intermeshing with the worm 35 suitably mounted in the housing 36, said worm being preferably left-hand and of self-locking pitch, being manually operated by a driver's right hand when in the seat 37 by turning the wheel 38 thus rotating the shaft 39 keyed to the worm 35.

For cases where a self-locking worm is not used but one of steeper pitch is preferred, I provide on the shaft 39 the ratchet 40 with its pawl 41 keyed to the rod 42 and provided with the cranked handle 43.

Figures 6, 7 and 8 show a second embodiment wherein the steam 29ª is formed of plain round stock for the entire length thereof, said stem being rotatable within the bushing member 44, said member (as well shown in Fig. 8) being provided with the vertically disposed rack member 45 projecting to the left from the square-socket bearing 46, said bearing as shown in Fig. 7 being slotted at 47 to accommodate said rack. The bushing 44 being slidable and nonrevoluble within the bearing 46 affords suitable interengagement between the rack 45 and the pinion 31, whereas the plain-faced idle wheel 48, pivoted at 49 backs up the pinion 31 so as to provide rolling contact while the pinion is traversing the rack, thereby reducing friction; the idler 50 operating in the same way but is toothed to interengage with the grooved elements 29ª.

In operation the tractor is first alined between the middle rows 52 and 53, then as the machine moves forward the respective blades skim along so as to shear the rows of grain off close to the ground whilst the guide-members 24 crowd the stems of the plants over, the effect of this is to comingle the rows 51 and 52 into the single row 52ª, and the rows 53 and 54 into the single row 54ª, thus clearing said single rows of the path of the tractor.

Should a depression in the surface be met the front of the machine can be raised by a clockwise manipulation of the hand wheel 38, which will prevent the blades from digging into the ground; similarly the machine can be raised to the position of the dotted line when turning headlands or when traveling from place to place.

When thus being raised from the operative to non-operative positions the frame structure is maintained in true alinement and side friction is minimized by the antifriction elements 55 and 55ª mounted in the channels 7 and 7ª and adapted to make contact with the vertical guides 56 and 56ª respectively.

It is believed that the construction, operation and advantages of the invention will now be clearly understood. The present embodiments of the invention have been disclosed in detail merely by way of example, since in actual practice they attain the features of advantage set forth as desideratums in the statement of the invention and the above description.

Numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. The combination in a harvesting machine, of a structural frame having adjacent the rear end thereof vertically pivotal means of attachment to a propelling means, said frame comprising forwardly-extending parallel members suitably spaced apart, a front transverse frame member secured to the forward ends of said parallel members, portions of said member extending beyond each parallel member, outer diagonal frame members whose forward ends are secured adjacent the ends of each extending member, the backward ends thereof being secured to the adjacent parallel member, inner diagonal frame members secured to said transverse member adjacent the middle thereof, said inner members being of greater length than the outer members and each secured to the inner side of its companion parallel frame member, said inner diagonal members inclosing an isoscelar triangular figure open at the apex, the said outer diagonals enclosing right triangular figures so disposed as to leave passage-way for crop matter between the apexes thereof and the sides of the isoscelar figure; front wheels for the support of said frame in normally horizontal position, standards suitably attached to said inner and said outer frame members and blade means secured to said standards, said blades being adapted to shear the stems of crop matter while traversing along the rows thereof.

2. In a harvesting machine as specified in claim 1, one or more front wheels off-set from vertically-journaled axes, said axes being provided with rack-like elements for interengagement with pinion means carried by the frame, a shaft to carry the pinion and manually-operable means for rotating said pinion so as to traverse up or down the rack element, and means for locking or releasing said pinion at any point of elevation in relation to the rack element, said pinion and said element constituting a means for elevating the front end of said machine combined with the ability to turn in any direction with respect to the ground surface.

3. In a harvesting machine as defined in claim 1, having a vertical pinion intermeshing with a rack element, a horizontal shaft for said pinion, a worm gear on the shaft, a worm element engaging the worm gear, a drive shaft for the worm suitably journaled and provided with means for manual rotation thereof adjacent the operator.

4. In a harvesting machine as set forth in claim 1, having revoluble wheel-axes and being provided with rack elements interengaging pinion means carried by the frame, idle antifriction means diametrically opposing said pinion and constituting a frictional relief between said axes and the contacting surfaces of their journals.

5. In a harvesting machine as defined in claim 1, a plurality of standards disposed below and suitably attached to said outer diagonal frame members, a plurality of standards disposed below and suitably attached to said inner diagonal frame members, bevel-edged blades secured to the standard, said standards suitably bowed to clear the crop. and suitably-mounted guide members adapted to gather two rows of crop matter into one row as the machine traverses the rows.

6. In a harvesting machine according to claim 1, having parallel structural frame members diagonally braced in the forward portion thereof, outer turn-buckle means adapted to brace the rear portion of said parallel frame against outward flexure, and anti-friction elements carried by said parallel members on the inner sides thereof, said elements being adapted to make rolling contact against relatively stationary vertical abutment means, said elements constituting means for lightening the lift when raising the front end of the machine.

7. A harvesting machine of the character described comprising a rectangular frame having side members adapted to be pivotally attached to a suitable tractor and adapted to be raised and lowered at its forward end, the latter being supported on adjustable wheels, said frame having mounted thereon diagonal members, the forward ends of which are attached to a transverse member of the rectangular frame and the rear ends attached to the side members, said diagonal members being relatively arranged in pairs in the form respectively of a Y on each side of the frame, and the inner member of each pair being of greater length than the outer member, said diagonal members being provided with harvesting blades, arranged and adapted to scrape along the surface of the ground and harvest the crops as and for the purpose described.

In testimony whereof I have signed my name to this specification, this 4th day of October, 1928.

ADOLF KERNS.